United States Patent Office 3,639,514
Patented Feb. 1, 1972

3,639,514
HYDROPHILIC GRAFT POLYMERS OF ETHYLENE/VINYLPYRROLIDONE COPOLYMER WITH ACRYLONITRILE GRAFTED THEREON BY POLYMERIZATION
Karl-Erwin Schnalke, Cologne-Flittard, Carlhans Suling and Heino Logemann, Leverkusen, and Raoul Resz, Cologne-Stammheim, Germany, assignors to Farbenfabriken Bayer Aktiengesellschaft, Leverkusen, Germany
No Drawing. Filed Sept. 13, 1967, Ser. No. 667,354
Claims priority, application Germany, Sept. 19, 1966, F 50,232
Int. Cl. C08f $15/22$
U.S. Cl. 260—878                                    1 Claim

ABSTRACT OF THE DISCLOSURE

The invention relates to new acrylonitrile graft polymers and to a process for this production, using as a graft basis a copolymer of ethylene and vinylpyrrolidone and grafting acrylonitrile thereon.

The acrylonitrile graft polymers have an improved affinity for water and, at the same time, a high softening point.

---

This invention relates to hydrophilic acrylonitrile graft polymers and is particular concerned with the production of these polymers by polymerising acrylonitrile in the presence of a prepolymer.

Attempts have been made to increase the dyeability and the moisture absorption of fibres from acrylonitrile polymers by the incorporation of hydrophilic compounds in the polymers or the fibres made thereof.

Hydrophilic compounds can be incorporated by various methods, for example by converting the nitrile groups in polyacrylonitrile into the more hydrophilic amide or carboxyl groups by copolymerisation of acrylonitrile with appropriate hydrophilic comonomers, or by the polymerisation of acrylonitrile in the presence of hydrophilic polymer or even blending polyacrylonitrile with high molecular weight hydrophilic polymers.

Known hydrophilic compounds which are suitable as comonomers include, for example, N-vinyl-pyrrolidone, N-vinylmorpholine, acrylamides, methacrylamides, and N-vinyloxazolidinone. Polymers of the aforementioned monomers are particularly suitable as polymeric compounds in the presence of which a hydrophilised polyacrylonitrile can be prepared by the polymerisation of acrylonitrile. Natural high molecular weight compounds, for example gelatin or polypeptides, have also often been used for improving the affinity of polyacrylonitrile for water.

The hydrophilisation of polyacrylonitrile in an "aquagel" state has been described in detail. In this process, a solution of hydrophobic acrylonitrile polymers or copolymers is converted into films or fibres by a wet spinning process. Hydrophilisation is then carried out with the "swollen" films or fibres. One disadvantage of this process is that it is limited for wet-spinning.

Many attempts have been made to obtain hydrophilic acrylonitrile polymers by copolymerising hydrophilic monomers with acrylonitrile.

One disadvantage common to all these processes is that any increase in the affinity for water or dye-absorption capacity of the fibres achieved, is accompanied with the loss of other necessary technological properties. For example, the softening point of the polymers is reduced considerably by the random incorporation of hydrophilic monomers, with the result that the resulting fibres are difficult to handle in dyeing. The thermoplastic properties of the polymer are also badly affected by the incorporation of relatively large quantities of hydrophilic monomers.

It has now been found that these mentioned disadvantages are avoided by an acrylonitrile graft polymer which comprises a prepolymer backbone consisting of 25–90% by weight of vinylpyrrolidone and 75–10% by weight of ethylene, with polymerized acrylonitrile being grafted onto said prepolymer, said graft polymer being prepared by polymerizing acrylonitrile in the presence of said prepolymer.

The acrylonitrile polymers obtained have improved affinity for water and, at the same time, a high softening point. They can be obtained by a process which comprises polymerising acrylonitrile in the presence of a copolymer from ethylene and vinylpyrrolidone, said polymerisation being effected in an aqueous medium in the presence of a redox-catalyst system at temperatures from $+30$ to $+70°$ C. and at a pH value of below 6.

It is known that graft polymers with an improved affinity for dyes can be obtained by polymerising acrylonitrile and another mono-olefinic compound under strictly controlled conditions in the presence of a prepolymer which, in addition to acrylonitrile, contains a substituted acrylamide as comonomer. This process has the disadvantage that the homopolymers of these substituted acrylamides, which are by-products particularly in polymerisation on an industrial scale, are insoluble in dimethyl formamide or dimethyl sulphoxide and, because of that must be separated from the spinning solutions by filtration before the production of fibres.

Another disadvantage of this process is, that for reasons of polymer compatibility, in every case acrylonitrile and a compound copolymerisable with it must be used if polymers with the requisite properties are wanted. With the exception of monomers which have to be added to the reaction medium in very small quantities (less than 1% by weight) in order to provide special effects of dyeability, any additional component gives rise to additional difficulties during polymerisation.

Examination of the copolymers has shown that the crystallinity of acrylonitrile polymers is generally reduced by copolymerisation. The unfavourable thermoplastic behaviour is therefore directly related to reduced crystallinity.

Unlike polyvinyl pyrrolidone which can only be grafted in good yields when it has a high molecular weight, the graft yield in the case of ethylene/vinyl pyrrolidone copolymers is uneffected by the molecular weight of the prepolymer. The process according to the invention has the advantage that the graft polymerisation can be carried out in low-viscosity reaction media.

The process according to the invention is carried out by dissolving 3 to 35% by weight, and preferably 5 to 25% by weight of an ethylene/vinylpyrrolidone copolymer (based on the monomers), in water optionally in the presence of a solution promoter such as alcohol, for example, and while stirring adding the monomers dropwise along with the catalyst. It is also possible, however, to add a solution of an ethylene/vinyl pyrrolidone copolymer dropwise to the polymerisation mixture simultaneously with the monomers.

It is possible in this way to provide high yields of fine-grained white polymers which form clear solutions in dimethyl formamide and from which satisfactory films or filaments can be obtained.

Polymerisation is started by radical initiators. Redox activation has proved to be particularly effective for the polymerisation of acrylonitrile. A mixture of potassium persulphate and a water-soluble compound of tetravalent sulphur, is a particularly suitable redox system.

Polymerization is carried out at a pH-value below 6 and at a temperature from 30 to 70° C., preferably from 40 to 60° C. Particularly good results are obtained when polymerisation is carried out in the presence of an aluminium salt. Tert.-butanol and methanol have proved to be particularly effective solution promoters. The ethylene/vinylpyrrolidone copolymers used as graft basis may be variable very widely in composition. The prepolymers used in accordance with the invention are prepared by free-radical catalyzed polymerization and are preferably prepared by the process described in British patent specification No. 1,013,020. It is advantageous to use polymers containing 25 to 90% of combined vinyl pyrrolidone.

It is of particular advantage to use copolymers of vinyl pyrrolidone and ethylene which have an intrinsic viscosity $\eta_{intr.}$ of 0.2 to 0.4, measured in dimethylformamide.

Polymerisation provides good results, irrespective of the degree of polymerisation, if the prepolymers contain at least 20% by weight of vinyl pyrrolidone.

The following examples are to further illustrate the invention without limiting it.

The intrinsic viscosity of the graft basis measured in methanol of $\eta_{intr.}=0.250$ as given in the examples lies within the range of an intrinsic viscosity of 0.2 to 0.4, measured in dimethylformamide.

EXAMPLE 1

2000 parts by weight of water, 60 parts by weight of 1 N-sulfuric acid and 120 parts by weight of potassium alum are introduced into a polymerisation vessel and heated to 50° C. Air is displaced from the vessel with nitrogen, after which 120 parts by weight of a copolymer of ethylene and vinyl pyrrolidone which has an intrinsic viscosity $[\eta]$ of 0.250 in methanol and contains 16.6% by weight of copolymerised ethylene, are dissolved in the contents of the vessel.

The following three solutions are then introduced into the polymerisation vessel within the three hours—

Solution I: 1700 parts by weight of water, 30 parts by weight of potassium persulfate and 20 parts by weight of 1 N-sulfuric acid.
Solution II: 1700 parts by weight of water and 6.5 parts by weight of sodium pyrosulfite.
Solution III: 100 parts by weight of acrylonitrile.

During polymerisation, the temperature in the reaction zone is kept at 58° C. After 10 minutes, a fine white-grained deposit begins to precipitate.

After 4 hours, the reaction medium is cooled and the resulting polymer is filtered off. After drying at 50° C. a pure white polymer is obtained in a yield of 80.5% of the theoretical amount based on acrylonitrile and prepolymer. The polymer has an extremely high thermal stability and can be processed into films and fibres from dimethyl sulfoxide and dimethyl formamide.

EXAMPLE 2

The following substances are introduced into a polymerisation vessel equipped with stirring mechanisms after air has been displaced by nitrogen: 200 parts by weight of desalted water; 100 parts by weight of tert.-butanol, 2.0 parts by weight of ammonium chloride and 1.0 part by weight of normal sulfuric acid.

This mixture then is heated to 53° C. after which the following three solutions are uniformly introduced into the reaction zone within three hours:

(I) 0.40 part by weight of $K_2S_2O_8$; 200 parts by weight of desalted water and 1.0 part by weight of 1 N-$H_2SO_4$.
(II) 0.65 part by weight of sodium pyrosulfite; 200 parts by weight of desalted water and 5 parts by weight of a copolymer of ethylene and vinyl pyrrolidone which has an intrinsic viscosity $[\eta]$ in methanol of 0.250 and which contains 84% by weight of combined vinyl pyrrolidone.
(III) 100 parts by weight of acrylonitrile.

After the solutions I, II and III have been introduced into the reaction vessel, the reaction mixture is kept at 53° C. for 1 hour. The product is then cooled and the resulting graft polymer is isolated by filtration. After drying at 50° C. a pure white polymer with a K-value of 86.4 is obtained in a yield of 80% of the theoretical amount based on acrylonitrile and prepolymer.

What we claim is:
1. An acrylonitrile graft polymer consisting essentially of
   (a) 3–30% by weight of a vinylpyrrolidone ethylene prepolymer prepared by free-radical catalyzed polymerization which consists of 25–90% by weight of vinylpyrrolidone and 75–10% by weight of ethylene, said prepolymer having an intrinsic viscosity $\eta_{intr.}$ of 0.2–0.4 measured in dimethylformamide; and
   (b) 97–70% by weight of acrylonitrile, said acrylonitrile being grafted onto said prepolymer (a) by polymerization of said acrylonitrile in the presence of said prepolymer in an aqueous medium in the presence of a redox-catalyst system at temperatures of from +30–+70° C. and at a pH value of below 6.

References Cited

UNITED STATES PATENTS

| 2,841,569 | 7/1958 | Rugg et al. | 260—878 |
| 3,342,900 | 9/1967 | Marans | 260—877 |
| 3,450,795 | 6/1969 | Langer | 260—878 |
| 3,296,231 | 1/1967 | Resz et al. | 260—88.1 |
| 3,310,605 | 3/1967 | Marans et al. | 204—159.17 |

FOREIGN PATENTS

| 555,500 | 9/1957 | Belgium | 260—878 |
| 1,013,020 | 12/1965 | Great Britain | 260—878 |

HARRY WONG, JR., Primary Examiner

U.S. Cl. X.R.

260—29.6, 30.8, 32.6, 33.4, 85.5, 88.1, 898